US010733326B2

(12) United States Patent
Raichelgauz et al.

(10) Patent No.: US 10,733,326 B2
(45) Date of Patent: Aug. 4, 2020

(54) SYSTEM AND METHOD FOR IDENTIFICATION OF INAPPROPRIATE MULTIMEDIA CONTENT

(71) Applicant: Cortica, Ltd., Ramat Gan (IL)

(72) Inventors: Igal Raichelgauz, New York, NY (US); Karina Odinaev, New York, NY (US); Yehoshua Y. Zeevi, Haifa (IL)

(73) Assignee: CORTICA LTD., Tel Aviv (IL)

( * ) Notice: Subject to any disclaimer, the term of this patent is extended or adjusted under 35 U.S.C. 154(b) by 0 days.

(21) Appl. No.: 14/314,579

(22) Filed: Jun. 25, 2014

(65) Prior Publication Data
US 2014/0310825 A1 Oct. 16, 2014

Related U.S. Application Data

(63) which is a continuation-in-part of application No. 13/770,603, filed on Feb. 19, 2013, which is a (Continued)

(30) Foreign Application Priority Data

Aug. 21, 2007 (IL) .......................................... 185414

(51) Int. Cl.
G06N 5/00 (2006.01)
G06F 1/00 (2006.01)
(Continued)

(52) U.S. Cl.
CPC .......... G06F 21/629 (2013.01); G06F 16/957 (2019.01); G06Q 30/0251 (2013.01);
(Continued)

(58) Field of Classification Search
CPC . G06N 5/02; G06N 5/04; G06N 5/022; G06F 17/30
See application file for complete search history.

(56) References Cited

U.S. PATENT DOCUMENTS 4,733,353 A 3/1988 Jaswa
4,932,645 A 6/1990 Schorey et al.
(Continued)

FOREIGN PATENT DOCUMENTS

WO 0231764 4/2002
WO 2003005242 A1 1/2003
(Continued)

OTHER PUBLICATIONS

Audio-Visual Content-Based Violent Scene Characterization, 1998 IEEE, Nam, Tewfik, et al. pp. 353-357.*
(Continued)

Primary Examiner — Paulinho E Smith
(74) Attorney, Agent, or Firm — Reches Patents

(57) ABSTRACT

A system and method for identification of inappropriate multimedia content elements are provided. The method includes receiving a request to identify a multimedia content element from a user device; generating at least one signature respective of the received multimedia content element; matching between the at least one of generated signature respective of the multimedia content element and at least one signature of each concept designated as inappropriate; determining whether a match is identified between the at least one of signature generated respective of the multimedia content element and the at least one signature of an inappropriate concept; and preventing the display on a user device of the multimedia content element, upon identification of a match.

20 Claims, 5 Drawing Sheets

Related U.S. Application Data continuation-in-part of application No. 13/624,397, filed on Sep. 21, 2012, which is a continuation-in-part of application No. 13/344,400, filed on Jan. 5, 2012, which is a continuation of application No. 12/434,221, filed on May 1, 2009, which is a continuation-in-part of application No. 12/084,150, filed on Apr. 7, 2009, which is a continuation of application No. PCT/IL2006/001235, filed on Oct. 26, 2006, which is a continuation-in-part of application No. 12/195,863, filed on Aug. 21, 2008, which is a continuation-in-part of application No. 12/084,150, filed on Apr. 7, 2009, which is a continuation-in-part of application No. 12/603,123, filed on Oct. 21, 2009, which is a continuation-in-part of application No. 12/084,150, filed on Apr. 7, 2009, which is a continuation-in-part of application No. 12/195,863, filed on Aug. 21, 2008, which is a continuation-in-part of application No. 12/348,888, filed on Jan. 5, 2009, which is a continuation-in-part of application No. 12/084,150, filed on Apr. 7, 2009, which is a continuation-in-part of application No. 12/195,863, filed on Aug. 21, 2008, which is a continuation-in-part of application No. 12/538,495, filed on Aug. 10, 2009, which is a continuation-in-part of application No. 12/084,150, filed on Apr. 7, 2009, which is a continuation-in-part of application No. 12/195,863, filed on Aug. 21, 2008, which is a continuation-in-part of application No. 12/084,150, filed on Apr. 7, 2009, which is a continuation-in-part of application No. 12/348,888, filed on Jan. 5, 2009.

(60) Provisional application No. 61/839,885, filed on Jun. 27, 2013.

(51) Int. Cl.

| | | |
|---|---|---|
| *G06F 21/62* | (2013.01) | |
| *G06F 16/957* | (2019.01) | |
| *G06Q 30/02* | (2012.01) | |
| *H04H 60/37* | (2008.01) | |
| *H04H 60/56* | (2008.01) | |
| *H04N 7/173* | (2011.01) | |
| *H04N 21/258* | (2011.01) | |
| *H04N 21/2668* | (2011.01) | |
| *H04N 21/466* | (2011.01) | |
| *H04N 21/81* | (2011.01) | |
| *H04H 20/10* | (2008.01) | |
| *H04H 60/65* | (2008.01) | |

(52) U.S. Cl.
CPC ............ *H04H 20/10* (2013.01); *H04H 60/37* (2013.01); *H04H 60/56* (2013.01); *H04H 60/65* (2013.01); *H04N 7/17318* (2013.01); *H04N 21/25891* (2013.01); *H04N 21/2668* (2013.01); *H04N 21/466* (2013.01); *H04N 21/8106* (2013.01); *H04H 2201/90* (2013.01)

(56) References Cited

U.S. PATENT DOCUMENTS

| | | |
|---|---|---|
| 4,972,363 A | 11/1990 | Nguyen et al. |
| 5,214,746 A | 5/1993 | Fogel et al. |
| 5,307,451 A | 4/1994 | Clark |
| 5,568,181 A | 10/1996 | Greenwood et al. |
| 5,638,425 A | 6/1997 | Meador et al. |
| 5,745,678 A | 4/1998 | Herzberg et al. |
| 5,806,061 A | 9/1998 | Chaudhuri et al. |
| 5,852,435 A | 12/1998 | Vigneaux et al. |
| 5,870,754 A | 2/1999 | Dimitrova et al. |
| 5,873,080 A | 2/1999 | Coden et al. |
| 5,887,193 A | 3/1999 | Takahashi et al. |
| 5,940,821 A | 8/1999 | Wical |
| 5,978,754 A | 11/1999 | Kumano |
| 5,987,454 A | 11/1999 | Hobbs |
| 5,991,306 A | 11/1999 | Burns et al. |
| 6,038,560 A | 3/2000 | Wical |
| 6,052,481 A | 4/2000 | Grajski et al. |
| 6,070,167 A | 5/2000 | Qian et al. |
| 6,076,088 A | 6/2000 | Paik et al. |
| 6,122,628 A | 9/2000 | Castelli et al. |
| 6,128,651 A | 10/2000 | Cezar |
| 6,137,911 A | 10/2000 | Zhilyaev |
| 6,144,767 A | 11/2000 | Bottou et al. |
| 6,147,636 A | 11/2000 | Gershenson |
| 6,240,423 B1 | 5/2001 | Hirata |
| 6,243,375 B1 | 6/2001 | Speicher |
| 6,243,713 B1 | 6/2001 | Nelson et al. |
| 6,275,599 B1 | 8/2001 | Adler et al. |
| 6,329,986 B1 | 12/2001 | Cheng |
| 6,363,373 B1 | 3/2002 | Steinkraus |
| 6,381,656 B1 | 4/2002 | Shankman |
| 6,411,229 B2 | 6/2002 | Kobayashi |
| 6,422,617 B1 | 7/2002 | Fukumoto et al. |
| 6,493,692 B1 | 12/2002 | Kobayashi et al. |
| 6,493,705 B1 | 12/2002 | Kobayashi et al. |
| 6,507,672 B1 | 1/2003 | Watkins et al. |
| 6,523,022 B1 | 2/2003 | Hobbs |
| 6,523,046 B2 | 2/2003 | Liu et al. |
| 6,524,861 B1 | 2/2003 | Anderson |
| 6,526,400 B1 | 2/2003 | Takata et al. |
| 6,550,018 B1 | 4/2003 | Abonamah et al. |
| 6,557,042 B1 | 4/2003 | He et al. |
| 6,560,597 B1 | 5/2003 | Dhillon et al. |
| 6,594,699 B1 | 7/2003 | Sahai et al. |
| 6,601,026 B2 | 7/2003 | Appelt et al. |
| 6,601,060 B1 | 7/2003 | Tomaru |
| 6,611,628 B1 | 8/2003 | Sekiguchi et al. |
| 6,611,837 B2 | 8/2003 | Schreiber |
| 6,618,711 B1 | 9/2003 | Ananth |
| 6,643,620 B1 | 11/2003 | Contolini et al. |
| 6,643,643 B1 | 11/2003 | Lee et al. |
| 6,665,657 B1 | 12/2003 | Dibachi |
| 6,675,159 B1 | 1/2004 | Lin et al. |
| 6,704,725 B1 | 3/2004 | Lee |
| 6,728,706 B2 | 4/2004 | Aggarwal et al. |
| 6,732,149 B1 | 5/2004 | Kephart |
| 6,751,363 B1 | 6/2004 | Natsev et al. |
| 6,751,613 B1 | 6/2004 | Lee et al. |
| 6,754,435 B2 | 6/2004 | Kim |
| 6,763,069 B1 | 7/2004 | Divakaran et al. |
| 6,763,519 B1 | 7/2004 | McColl et al. |
| 6,774,917 B1 | 8/2004 | Foote et al. |
| 6,795,818 B1 | 9/2004 | Lee |
| 6,804,356 B1 | 10/2004 | Krishnamachari |
| 6,813,395 B1 | 11/2004 | Kinjo |
| 6,819,797 B1 | 11/2004 | Smith et al. |
| 6,836,776 B2 | 12/2004 | Schreiber |
| 6,845,374 B1 | 1/2005 | Oliver et al. |
| 6,901,207 B1 | 5/2005 | Watkins |
| 6,938,025 B1 | 8/2005 | Lulich et al. |
| 6,970,881 B1 | 11/2005 | Mohan et al. |
| 6,978,264 B2 | 12/2005 | Chandrasekar et al. |
| 7,006,689 B2 | 2/2006 | Kasutani |
| 7,013,051 B2 | 3/2006 | Sekiguchi et al. |
| 7,020,654 B1 | 3/2006 | Najmi |
| 7,043,473 B1 | 5/2006 | Rassool et al. |
| 7,047,033 B2 | 5/2006 | Wyler |
| 7,124,149 B2 | 10/2006 | Smith et al. |
| 7,158,681 B2 | 1/2007 | Persiantsev |
| 7,199,798 B1 | 4/2007 | Echigo et al. |
| 7,215,828 B2 | 5/2007 | Luo |
| 7,260,564 B1 | 8/2007 | Lynn et al. |
| 7,277,928 B2 | 10/2007 | Lennon |
| 7,296,012 B2 | 11/2007 | Ohashi |
| 7,299,261 B1 | 11/2007 | Oliver et al. |
| 7,302,117 B2 | 11/2007 | Sekiguchi et al. |
| 7,313,805 B1 | 12/2007 | Rosin et al. |

(56) References Cited

U.S. PATENT DOCUMENTS

| | | |
|---|---|---|
| 7,340,458 B2 | 3/2008 | Vaithilingam et al. |
| 7,346,629 B2 | 3/2008 | Kapur et al. |
| 7,353,224 B2 | 4/2008 | Chen et al. |
| 7,376,672 B2 | 5/2008 | Weare |
| 7,376,722 B1 | 5/2008 | Sim et al. |
| 7,392,238 B1 | 6/2008 | Zhou et al. |
| 7,406,459 B2 | 7/2008 | Chen et al. |
| 7,433,895 B2 | 10/2008 | Li et al. |
| 7,450,740 B2 | 11/2008 | Shah et al. |
| 7,464,086 B2 | 12/2008 | Black et al. |
| 7,519,238 B2 | 4/2009 | Robertson et al. |
| 7,523,102 B2 | 4/2009 | Bjarnestam et al. |
| 7,526,607 B1 | 4/2009 | Singh et al. |
| 7,529,659 B2 | 5/2009 | Wold |
| 7,536,384 B2 | 5/2009 | Venkataraman et al. |
| 7,536,417 B2 | 5/2009 | Walsh et al. |
| 7,542,969 B1 | 6/2009 | Rappaport et al. |
| 7,548,910 B1 | 6/2009 | Chu et al. |
| 7,555,477 B2 | 6/2009 | Bayley et al. |
| 7,555,478 B2 | 6/2009 | Bayley et al. |
| 7,562,076 B2 | 7/2009 | Kapur |
| 7,574,436 B2 | 8/2009 | Kapur et al. |
| 7,574,668 B2 | 8/2009 | Nunez et al. |
| 7,577,656 B2 | 8/2009 | Kawai et al. |
| 7,657,100 B2 | 2/2010 | Gokturk et al. |
| 7,660,468 B2 | 2/2010 | Gokturk et al. |
| 7,660,737 B1 | 2/2010 | Lim et al. |
| 7,689,544 B2 | 3/2010 | Koenig |
| 7,694,318 B2 | 4/2010 | Eldering et al. |
| 7,697,791 B1 | 4/2010 | Chan et al. |
| 7,769,221 B1 | 8/2010 | Shakes et al. |
| 7,788,132 B2 | 8/2010 | Desikan et al. |
| 7,788,247 B2 | 8/2010 | Wang et al. |
| 7,836,054 B2 | 11/2010 | Kawai et al. |
| 7,860,895 B1 | 12/2010 | Scofield et al. |
| 7,904,503 B2 | 3/2011 | Van De Sluis |
| 7,920,894 B2 | 4/2011 | Wyler |
| 7,921,107 B2 | 4/2011 | Chang et al. |
| 7,933,407 B2 | 4/2011 | Keidar et al. |
| 7,974,994 B2 | 7/2011 | Li et al. |
| 7,987,194 B1 | 7/2011 | Walker et al. |
| 7,987,217 B2 | 7/2011 | Long et al. |
| 7,991,715 B2 | 8/2011 | Schiff et al. |
| 8,000,655 B2 | 8/2011 | Wang et al. |
| 8,023,739 B2 | 9/2011 | Hohimer et al. |
| 8,036,893 B2 | 10/2011 | Reich |
| 8,098,934 B2 | 1/2012 | Vincent et al. |
| 8,112,376 B2 | 2/2012 | Raichelgauz et al. |
| 8,266,185 B2 | 9/2012 | Raichelgauz et al. |
| 8,312,031 B2 | 11/2012 | Raichelgauz et al. |
| 8,315,442 B2 | 11/2012 | Gokturk et al. |
| 8,316,005 B2 | 11/2012 | Moore |
| 8,326,775 B2 | 12/2012 | Raichelgauz et al. |
| 8,332,478 B2 | 12/2012 | Levy et al. |
| 8,345,982 B2 | 1/2013 | Gokturk et al. |
| 8,457,827 B1 | 6/2013 | Ferguson et al. |
| 8,495,489 B1 | 7/2013 | Everingham |
| 8,548,828 B1 | 10/2013 | Longmire |
| 8,655,801 B2 | 2/2014 | Raichelgauz et al. |
| 8,677,377 B2 | 3/2014 | Cheyer et al. |
| 8,682,667 B2 | 3/2014 | Haughay |
| 8,688,446 B2 | 4/2014 | Yanagihara |
| 8,706,503 B2 | 4/2014 | Cheyer et al. |
| 8,775,442 B2 | 7/2014 | Moore et al. |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,619 B2 | 10/2014 | Raichelgauz et al. |
| 8,868,861 B2 | 10/2014 | Shimizu et al. |
| 8,880,539 B2 | 11/2014 | Raichelgauz et al. |
| 8,880,566 B2 | 11/2014 | Raichelgauz et al. |
| 8,886,648 B1 | 11/2014 | Procopio et al. |
| 8,898,568 B2 | 11/2014 | Bull et al. |
| 8,922,414 B2 | 12/2014 | Raichelgauz et al. |
| 8,959,037 B2 | 2/2015 | Raichelgauz et al. |
| 8,990,125 B2 | 3/2015 | Raichelgauz et al. |
| 9,009,086 B2 | 4/2015 | Raichelgauz et al. |
| 9,031,999 B2 | 5/2015 | Raichelgauz et al. |
| 9,087,049 B2 | 7/2015 | Raichelgauz et al. |
| 9,104,747 B2 | 8/2015 | Raichelgauz et al. |
| 9,165,406 B1 | 10/2015 | Gray et al. |
| 9,191,626 B2 | 11/2015 | Raichelgauz et al. |
| 9,197,244 B2 | 11/2015 | Raichelgauz et al. |
| 9,218,606 B2 | 12/2015 | Raichelgauz et al. |
| 9,235,557 B2 | 1/2016 | Raichelgauz et al. |
| 9,256,668 B2 | 2/2016 | Raichelgauz et al. |
| 9,323,754 B2 | 4/2016 | Ramanathan et al. |
| 9,330,189 B2 | 5/2016 | Raichelgauz et al. |
| 9,384,196 B2 | 7/2016 | Raichelgauz et al. |
| 9,438,270 B2 | 9/2016 | Raichelgauz et al. |
| 9,466,068 B2 | 10/2016 | Raichelgauz et al. |
| 9,606,992 B2 | 3/2017 | Geisner et al. |
| 9,646,006 B2 | 5/2017 | Raichelgauz et al. |
| 9,984,369 B2 * | 5/2018 | Li .................. G06F 21/10 |
| 2001/0019633 A1 | 9/2001 | Tenze et al. |
| 2001/0038876 A1 | 11/2001 | Anderson |
| 2001/0056427 A1 | 12/2001 | Yoon et al. |
| 2002/0010682 A1 | 1/2002 | Johnson |
| 2002/0010715 A1 | 1/2002 | Chinn et al. |
| 2002/0019881 A1 | 2/2002 | Bokhari et al. |
| 2002/0032677 A1 | 3/2002 | Morgenthaler et al. |
| 2002/0038299 A1 | 3/2002 | Zernik et al. |
| 2002/0059580 A1 | 5/2002 | Kalker et al. |
| 2002/0072935 A1 | 6/2002 | Rowse et al. |
| 2002/0087530 A1 | 7/2002 | Smith et al. |
| 2002/0099870 A1 | 7/2002 | Miller et al. |
| 2002/0107827 A1 | 8/2002 | Benitez-Jimenez et al. |
| 2002/0123928 A1 | 9/2002 | Eldering et al. |
| 2002/0126872 A1 | 9/2002 | Brunk et al. |
| 2002/0129140 A1 | 9/2002 | Peled et al. |
| 2002/0129296 A1 | 9/2002 | Kwiat et al. |
| 2002/0143976 A1 | 10/2002 | Barker et al. |
| 2002/0147637 A1 | 10/2002 | Kraft et al. |
| 2002/0152267 A1 | 10/2002 | Lennon |
| 2002/0157116 A1 | 10/2002 | Jasinschi |
| 2002/0159640 A1 | 10/2002 | Vaithilingam et al. |
| 2002/0161739 A1 | 10/2002 | Oh |
| 2002/0163532 A1 | 11/2002 | Thomas et al. |
| 2002/0174095 A1 | 11/2002 | Lulich et al. |
| 2002/0178410 A1 | 11/2002 | Haitsma et al. |
| 2003/0028660 A1 | 2/2003 | Igawa et al. |
| 2003/0041047 A1 | 2/2003 | Chang et al. |
| 2003/0050815 A1 | 3/2003 | Seigel et al. |
| 2003/0078766 A1 | 4/2003 | Appelt et al. |
| 2003/0086627 A1 | 5/2003 | Berriss et al. |
| 2003/0089216 A1 * | 5/2003 | Birmingham ........ G10H 1/0041 84/609 |
| 2003/0105739 A1 | 6/2003 | Essafi et al. |
| 2003/0126147 A1 | 7/2003 | Essafi et al. |
| 2003/0182567 A1 | 9/2003 | Barton et al. |
| 2003/0191764 A1 | 10/2003 | Richards |
| 2003/0200217 A1 | 10/2003 | Ackerman |
| 2003/0217335 A1 | 11/2003 | Chung et al. |
| 2003/0229531 A1 | 12/2003 | Heckerman et al. |
| 2004/0003394 A1 | 1/2004 | Ramaswamy |
| 2004/0025180 A1 | 2/2004 | Begeja et al. |
| 2004/0068510 A1 | 4/2004 | Hayes et al. |
| 2004/0107181 A1 | 6/2004 | Rodden |
| 2004/0111465 A1 | 6/2004 | Chuang et al. |
| 2004/0117367 A1 | 6/2004 | Smith et al. |
| 2004/0117638 A1 | 6/2004 | Monroe |
| 2004/0128142 A1 | 7/2004 | Whitham |
| 2004/0128511 A1 | 7/2004 | Sun et al. |
| 2004/0133927 A1 | 7/2004 | Sternberg et al. |
| 2004/0153426 A1 | 8/2004 | Nugent |
| 2004/0215663 A1 | 10/2004 | Liu et al. |
| 2004/0249779 A1 | 12/2004 | Nauck et al. |
| 2004/0260688 A1 | 12/2004 | Gross |
| 2004/0267774 A1 | 12/2004 | Lin et al. |
| 2005/0021394 A1 | 1/2005 | Miedema et al. |
| 2005/0114198 A1 | 5/2005 | Koningstein et al. |
| 2005/0131884 A1 | 6/2005 | Gross et al. |
| 2005/0144455 A1 | 6/2005 | Haitsma |
| 2005/0172130 A1 | 8/2005 | Roberts |

(56) References Cited

U.S. PATENT DOCUMENTS

| | | |
|---|---|---|
| 2005/0177372 A1 | 8/2005 | Wang et al. |
| 2005/0238198 A1 | 10/2005 | Brown et al. |
| 2005/0238238 A1 | 10/2005 | Xu et al. |
| 2005/0245241 A1 | 11/2005 | Durand et al. |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0013451 A1 | 1/2006 | Haitsma |
| 2006/0020860 A1 | 1/2006 | Tardif et al. |
| 2006/0020958 A1 | 1/2006 | Allamanche et al. |
| 2006/0026203 A1 | 2/2006 | Tan et al. |
| 2006/0031216 A1 | 2/2006 | Semple et al. |
| 2006/0041596 A1 | 2/2006 | Stirbu et al. |
| 2006/0048191 A1 | 3/2006 | Xiong |
| 2006/0064037 A1 | 3/2006 | Shalon et al. |
| 2006/0112035 A1 | 5/2006 | Cecchi et al. |
| 2006/0129822 A1 | 6/2006 | Snijder et al. |
| 2006/0143674 A1 | 6/2006 | Jones et al. |
| 2006/0153296 A1 | 7/2006 | Deng |
| 2006/0159442 A1 | 7/2006 | Kim et al. |
| 2006/0173688 A1 | 8/2006 | Whitham |
| 2006/0184638 A1 | 8/2006 | Chua et al. |
| 2006/0204035 A1 | 9/2006 | Guo et al. |
| 2006/0217818 A1 | 9/2006 | Fujiwara |
| 2006/0217828 A1 | 9/2006 | Hicken |
| 2006/0224529 A1 | 10/2006 | Kermani |
| 2006/0236343 A1 | 10/2006 | Chang |
| 2006/0242139 A1 | 10/2006 | Butterfield et al. |
| 2006/0242554 A1 | 10/2006 | Gerace et al. |
| 2006/0247983 A1 | 11/2006 | Dalli |
| 2006/0248558 A1 | 11/2006 | Barton et al. |
| 2006/0253423 A1 | 11/2006 | McLane et al. |
| 2007/0009159 A1 | 1/2007 | Fan |
| 2007/0011151 A1 | 1/2007 | Hagar et al. |
| 2007/0019864 A1 | 1/2007 | Koyama et al. |
| 2007/0033163 A1 | 2/2007 | Epstein et al. |
| 2007/0038608 A1 | 2/2007 | Chen |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0067682 A1* | 3/2007 | Fang .................. G06F 21/565 714/100 |
| 2007/0071330 A1 | 3/2007 | Oostveen et al. |
| 2007/0074147 A1 | 3/2007 | Wold |
| 2007/0083611 A1 | 4/2007 | Farago et al. |
| 2007/0091106 A1 | 4/2007 | Moroney |
| 2007/0130112 A1 | 6/2007 | Lin |
| 2007/0130159 A1 | 6/2007 | Gulli et al. |
| 2007/0156720 A1 | 7/2007 | Maren |
| 2007/0168413 A1 | 7/2007 | Barletta et al. |
| 2007/0174320 A1 | 7/2007 | Chou |
| 2007/0195987 A1 | 8/2007 | Rhoads |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0255785 A1 | 11/2007 | Hayashi et al. |
| 2007/0268309 A1 | 11/2007 | Tanigawa et al. |
| 2007/0282826 A1 | 12/2007 | Hoeber et al. |
| 2007/0294295 A1 | 12/2007 | Finkelstein et al. |
| 2007/0298152 A1 | 12/2007 | Baets |
| 2008/0019614 A1 | 1/2008 | Robertson et al. |
| 2008/0040277 A1 | 2/2008 | Dewitt |
| 2008/0046406 A1 | 2/2008 | Seide et al. |
| 2008/0049629 A1 | 2/2008 | Morrill |
| 2008/0072256 A1 | 3/2008 | Boicey et al. |
| 2008/0091527 A1 | 4/2008 | Silverbrook et al. |
| 2008/0152231 A1 | 6/2008 | Gokturk et al. |
| 2008/0163288 A1 | 7/2008 | Ghosal et al. |
| 2008/0165861 A1 | 7/2008 | Wen et al. |
| 2008/0172615 A1 | 7/2008 | Igelman et al. |
| 2008/0201299 A1 | 8/2008 | Lehikoinen et al. |
| 2008/0201314 A1 | 8/2008 | Smith et al. |
| 2008/0204706 A1 | 8/2008 | Magne et al. |
| 2008/0228995 A1 | 9/2008 | Tan et al. |
| 2008/0237359 A1 | 10/2008 | Silverbrook et al. |
| 2008/0253737 A1 | 10/2008 | Kimura et al. |
| 2008/0263579 A1 | 10/2008 | Mears et al. |
| 2008/0270373 A1* | 10/2008 | Oostveen .......... G06F 17/30825 |
| 2008/0307454 A1 | 12/2008 | Ahanger et al. |
| 2008/0313140 A1 | 12/2008 | Pereira et al. |
| 2009/0013414 A1* | 1/2009 | Washington ............ G06F 21/10 726/32 |
| 2009/0022472 A1 | 1/2009 | Bronstein et al. |
| 2009/0024641 A1 | 1/2009 | Quigley et al. |
| 2009/0037408 A1 | 2/2009 | Rodgers |
| 2009/0043637 A1 | 2/2009 | Eder |
| 2009/0043818 A1 | 2/2009 | Raichelgauz et al. |
| 2009/0089587 A1 | 4/2009 | Brunk et al. |
| 2009/0119157 A1 | 5/2009 | Dulepet |
| 2009/0125529 A1 | 5/2009 | Vydiswaran et al. |
| 2009/0125544 A1 | 5/2009 | Brindley |
| 2009/0148045 A1 | 6/2009 | Lee et al. |
| 2009/0157575 A1 | 6/2009 | Schobben et al. |
| 2009/0172030 A1 | 7/2009 | Schiff et al. |
| 2009/0175538 A1 | 7/2009 | Bronstein et al. |
| 2009/0204511 A1 | 8/2009 | Tsang |
| 2009/0216639 A1 | 8/2009 | Kapczynski et al. |
| 2009/0220138 A1 | 9/2009 | Zhang et al. |
| 2009/0226930 A1 | 9/2009 | Roep et al. |
| 2009/0245573 A1 | 10/2009 | Saptharishi et al. |
| 2009/0245603 A1 | 10/2009 | Koruga et al. |
| 2009/0253583 A1 | 10/2009 | Yoganathan |
| 2009/0254824 A1 | 10/2009 | Singh |
| 2009/0259687 A1 | 10/2009 | Do et al. |
| 2009/0277322 A1 | 11/2009 | Cai et al. |
| 2009/0282218 A1 | 11/2009 | Raichelgauz et al. |
| 2010/0023400 A1 | 1/2010 | Dewitt |
| 2010/0042646 A1 | 2/2010 | Raichelgauz et al. |
| 2010/0082684 A1 | 4/2010 | Churchill et al. |
| 2010/0088321 A1 | 4/2010 | Soloman et al. |
| 2010/0104184 A1 | 4/2010 | Bronstein et al. |
| 2010/0106857 A1 | 4/2010 | Wyler |
| 2010/0125569 A1 | 5/2010 | Nair et al. |
| 2010/0162405 A1 | 6/2010 | Cook et al. |
| 2010/0173269 A1 | 7/2010 | Puri et al. |
| 2010/0191567 A1 | 7/2010 | Lee et al. |
| 2010/0198626 A1 | 8/2010 | Cho et al. |
| 2010/0268524 A1 | 10/2010 | Nath et al. |
| 2010/0306193 A1 | 12/2010 | Pereira et al. |
| 2010/0318493 A1 | 12/2010 | Wessling |
| 2010/0322522 A1 | 12/2010 | Wang et al. |
| 2010/0325581 A1 | 12/2010 | Finkelstein et al. |
| 2011/0035289 A1 | 2/2011 | King et al. |
| 2011/0052063 A1 | 3/2011 | McAuley et al. |
| 2011/0055585 A1 | 3/2011 | Lee |
| 2011/0106782 A1 | 5/2011 | Ke et al. |
| 2011/0125727 A1 | 5/2011 | Zou et al. |
| 2011/0145068 A1 | 6/2011 | King et al. |
| 2011/0164810 A1 | 7/2011 | Zang et al. |
| 2011/0202848 A1 | 8/2011 | Ismalon |
| 2011/0208822 A1 | 8/2011 | Rathod |
| 2011/0246566 A1 | 10/2011 | Kashef et al. |
| 2011/0251896 A1 | 10/2011 | Impollonia et al. |
| 2011/0296315 A1 | 12/2011 | Lin et al. |
| 2011/0313856 A1 | 12/2011 | Cohen et al. |
| 2012/0082362 A1 | 4/2012 | Diem et al. |
| 2012/0131454 A1 | 5/2012 | Shah |
| 2012/0150890 A1 | 6/2012 | Jeong et al. |
| 2012/0167133 A1 | 6/2012 | Carroll et al. |
| 2012/0185445 A1 | 7/2012 | Borden et al. |
| 2012/0191686 A1 | 7/2012 | Hjelm et al. |
| 2012/0197857 A1 | 8/2012 | Huang et al. |
| 2012/0227074 A1 | 9/2012 | Hill et al. |
| 2012/0239690 A1 | 9/2012 | Asikainen et al. |
| 2012/0239694 A1 | 9/2012 | Avner et al. |
| 2012/0299961 A1 | 11/2012 | Ramkumar et al. |
| 2012/0301105 A1 | 11/2012 | Rehg et al. |
| 2012/0330869 A1 | 12/2012 | Durham |
| 2012/0331011 A1 | 12/2012 | Raichelgauz et al. |

(56) References Cited

U.S. PATENT DOCUMENTS

| | | | |
|---|---|---|---|
| 2013/0031489 A1 | 1/2013 | Gubin et al. | |
| 2013/0066856 A1 | 3/2013 | Ong et al. | |
| 2013/0067035 A1 | 3/2013 | Amanat et al. | |
| 2013/0067364 A1 | 3/2013 | Bemtson et al. | |
| 2013/0080433 A1 | 3/2013 | Raichelgauz et al. | |
| 2013/0086499 A1 | 4/2013 | Dyor et al. | |
| 2013/0089248 A1 | 4/2013 | Remiszewski et al. | |
| 2013/0104251 A1 | 4/2013 | Moore et al. | |
| 2013/0159298 A1 | 6/2013 | Mason et al. | |
| 2013/0173635 A1 | 7/2013 | Sanjeev | |
| 2013/0226930 A1 | 8/2013 | Arngren et al. | |
| 2013/0283401 A1* | 10/2013 | Pabla | G06F 21/60 726/30 |
| 2013/0325550 A1 | 12/2013 | Varghese et al. | |
| 2013/0332951 A1 | 12/2013 | Gharaat et al. | |
| 2014/0019264 A1 | 1/2014 | Wachman et al. | |
| 2014/0025692 A1 | 1/2014 | Pappas | |
| 2014/0147829 A1 | 5/2014 | Jerauld | |
| 2014/0152698 A1 | 6/2014 | Kim et al. | |
| 2014/0176604 A1 | 6/2014 | Venkitaraman et al. | |
| 2014/0188786 A1 | 7/2014 | Raichelgauz et al. | |
| 2014/0193077 A1 | 7/2014 | Shiiyama et al. | |
| 2014/0250032 A1 | 9/2014 | Huang et al. | |
| 2014/0282655 A1 | 9/2014 | Roberts | |
| 2014/0300722 A1 | 10/2014 | Garcia | |
| 2014/0310825 A1 | 10/2014 | Raichelgauz et al. | |
| 2014/0330830 A1 | 11/2014 | Raichelgauz et al. | |
| 2014/0341476 A1 | 11/2014 | Kulick et al. | |
| 2015/0154189 A1 | 6/2015 | Raichelgauz et al. | |
| 2015/0286742 A1 | 10/2015 | Zhang et al. | |
| 2015/0289022 A1 | 10/2015 | Gross | |
| 2016/0026707 A1 | 1/2016 | Ong et al. | |
| 2016/0239566 A1 | 8/2016 | Raichelgauz et al. | |

FOREIGN PATENT DOCUMENTS

| | | | |
|---|---|---|---|
| WO | 2003067467 A1 | 8/2003 | |
| WO | 2004019527 A1 | 3/2004 | |
| WO | 2005027457 A1 | 3/2005 | |
| WO | 20070049282 | 5/2007 | |
| WO | 2014137337 A1 | 9/2014 | |
| WO | 2016040376 A1 | 3/2016 | |

OTHER PUBLICATIONS

Wang et al., "Classifying Objectionable Websites Based on Image Content", Stanford University, pp. 1-12, 27 1998 (Year: 1998).*

Ware et al., "Locating and Identifying Components in a Robot's Workspace using Hybrid Computer Architecture", University of Glamorgan, 1995 (Year: 1995).*

International Search Authority: International Preliminary Report on Patentability (Chapter I of the Patent Cooperation Treaty) including "Written Opinion of the International Searching Authority" (PCT Rule 43bis. 1) for the related International Patent Application No. PCT/IL2006/001235; dated Jul. 28, 2009.

Boari et al, "Adaptive Routing for Dynamic Applications in Massively Parallel Architectures", 1995 IEEE, Spring 1995.

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

Cernansky et al., "Feed-forward Echo State Networks"; Proceedings of International Joint Conference on Neural Networks, Montreal, Canada, Jul. 31-Aug. 4, 2005.

Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.

Foote, Jonathan et al., "Content-Based Retrieval of Music and Audio"; 1997, Institute of Systems Science, National University of Singapore, Singapore (Abstract).

International Search Authority: "Written Opinion of the International Searching Authority" (PCT Rule 43bis.1) including International Search Report for the related International Patent Application No. PCT/US2008/073852; dated Jan. 28, 2009; Entire Document.

International Search Report for the related International Patent Application PCT/IL2006/001235; dated Nov. 2, 2008.

IPO Examination Report under Section 18(3) for corresponding UK application No. GB1001219.3, dated May 30, 2012.

Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.

Jaeger, H.: "The "echo state" approach to analysing and training recurrent neural networks", GMD Report, No. 148, 2001, pp. 1-43, XP002466251. German National Research Center for Information Technology.

Lin, C.; Chang, S.;, "Generating Robust Digital Signature for Image/Video Authentication," Multimedia and Security Workshop at ACM Multimedia '98. Bristol, U.K. Sep. 1998, pp. 49-54.

Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.

Maass, W. et al.: "Computational Models for Generic Cortical Microcircuits", Institute for Theoretical Computer Science, Technische Universitaet Graz, Graz, Austria, published Jun. 10, 2003.

Morad, T.Y. et al.: "Performance, Power Efficiency and Scalability of Asymmetric Cluster Chip Multiprocessors", Computer Architecture Letters, vol. 4, Jul. 4, 2005 (Jul. 4, 2005), pp. 1-4, XP002466254.

Nagy et al, "A Transputer, Based, Flexible, Real-Time Control System for Robotic Manipulators", UKACC International Conference on Control '96, Sep. 2-5, 1996, Conference 1996, Conference Publication No. 427, IEE 1996.

Natsclager, T. et al.: "The "liquid computer": A novel strategy for real-time computing on time series", Special Issue on Foundations of Information Processing of Telematik, vol. 8, No. 1, 2002, pp. 39-43, XP002466253.

Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.

Raichelgauz, I. et al.: "Co-evolutionary Learning in Liquid Architectures", Lecture Notes in Computer Science, [Online] vol. 3512, Jun. 21, 2005 (Jun. 21, 2005), pp. 241-248, XP019010280 Springer Berlin / Heidelberg ISSN: 1611-3349 ISBN: 978-3-540-26208-4.

Ribert et al. "An Incremental Hierarchical Clustering", Visicon Interface 1999, pp. 586-591.

Scheper et al, "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.

Theodoropoulos et al, "Simulating Asynchronous Architectures on Transputer Networks", Proceedings of the Fourth Euromicro Workshop on Parallel and Distributed Processing, 1996. PDP '96.

Verstraeten et al., "Isolated word recognition with the Liquid State Machine; a case study"; Department of Electronics and Information Systems, Ghent University, Sint-Pietersnieuwstraat 41, 9000 Gent, Belgium, Available online Jul. 14, 2005; Entire Document.

Verstraeten et al.: "Isolated word recognition with the Liquid State Machine; a case study", Information Processing Letters, Amsterdam, NL, col. 95, No. 6, Sep. 30, 2005 (Sep. 30, 2005), pp. 521-528, XP005028093 ISSN: 0020-0190.

Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.

Zeevi, Y. et al.: "Natural Signal Classification by Neural Cliques and Phase-Locked Attractors", IEEE World Congress on Computational Intelligence, IJCNN2006, Vancouver, Canada, Jul. 2006 (Jul. 2006), XP002466252.

(56) References Cited

OTHER PUBLICATIONS

Zhou et al., "Ensembling neural networks: Many could be better than all"; National Laboratory for Novel Software Technology, Nanjing Unviersirty, Hankou Road 22, Nanjing 210093, PR China; Available online Mar. 12, 2002.
Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.
Cococcioni, et al, "Automatic Diagnosis of Defects of Rolling Element Bearings Based on Computational Intelligence Techniques", University of Pisa, Pisa, Italy, 2009.
Emami, et al, "Role of Spatiotemporal Oriented Energy Features for Robust Visual Tracking in Video Surveillance, University of Queensland", St. Lucia, Australia, 2012.
Mandhaoui, et al, "Emotional Speech Characterization Based on Multi-Features Fusion for Face-to-Face Interaction", Universite Pierre et Marie Curie, Paris, France, 2009.
Marti, et al, "Real Time Speaker Localization and Detection System for Camera Steering in Multiparticipant Videoconferencing Environments", Universidad Politecnica de Valencia, Spain, 2011.
Guo et al, "AdOn: An Intelligent Overlay Video Advertising System", SIGIR, Boston, Massachusetts, Jul. 19-23, 2009.
Mei, et al., "Contextual In-Image Advertising", Microsoft Research Asia, pp. 439-448, 2008.
Mei, et al., "VideoSense—Towards Effective Online Video Advertising", Microsoft Research Asia, pp. 1075-1084, 2007.
Semizarov et al. "Specificity of Short Interfering RNA Determined through Gene Expression Signatures", PNAS, 2003, pp. 6347-6352.
Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.
Gong, et al., "A Knowledge-based Mediator for Dynamic Integration of Heterogeneous Multimedia Information Sources", Video and Speech Processing, 2004, Proceedings of 2004 International Symposium on Year: 2004, pp. 467-470, DOI: 10.1109/ISIMP.2004.1434102 IEEE Conference Publications, Hong Kong.
Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.
Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.20142359332 IEEE Journals & Magazines.
Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publications.
Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP.2012.6343465, Czech Republic.
Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.
Wang et al. "A Signature for Content-based Image Retrieval Using a Geometrical Transform", ACM 1998, pp. 229-234.
Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.
Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.

Lin, et al., "Robust Digital Signature for Multimedia Authentication: A Summary", IEEE Circuits and Systems Magazine, 4th Quarter 2003, pp. 23-26.
May et al., "The Transputer", Springer-Verlag, Berlin Heidelberg, 1989, teaches multiprocessing system.
Vailaya, et al., "Content-Based Hierarchical Classification of Vacation Images," I.E.E.E.: Multimedia Computing and Systems, vol. 1, 1999, East Lansing, MI, pp. 518-523.
Vallet, et al., "Personalized Content Retrieval in Context Using Ontological Knowledge," IEEE Transactions on Circuits and Systems for Video Technology, vol. 17, No. 3, Mar. 2007, pp. 336-346.
Whitby-Strevens, "The Transputer", 1985 IEEE, Bristol, UK.
Yanai, "Generic Image Classification Using Visual Knowledge on the Web," MM'03, Nov. 2-8, 2003, Tokyo, Japan, pp. 167-176.
Odinaev, et al., "Cliques in Neural Ensembles as Perception Carriers", Technion—Israel Institute of Technology, 2006 International Joint Conference on Neural Networks, Canada, 2006, pp. 285-292.
The International Search Report and the Written Opinion for PCT/US2016/054634 dated Mar. 16, 2017, ISA/RU, Moscow, RU.
Lau, et al., "Semantic Web Service Adaptation Model for a Pervasive Learning Scenario", 2008 IEEE Conference on Innovative Technologies in Intelligent Systems and Industrial Applications Year: 2008, pp. 98-103, DOI: 10.1109/CITISIA.2008.4607342 IEEE Conference Publications.
McNamara, et al., "Diversity Decay in Opportunistic Content Sharing Systems", 2011 IEEE International Symposium on a World of Wireless, Mobile and Multimedia Networks Year: 2011, pp. 1-3, DOI: 10.1109/WoWMoM.2011.5986211 IEEE Conference Publications.
Santos, et al., "SCORM-MPEG: an Ontology of Interoperable Metadata for Multimedia and e-Learning", 2015 23rd International Conference on Software, Telecommunications and Computer Networks (SoftCOM) Year: 2015, pp. 224-228, DOI: 10.1109/SOFTCOM.2015.7314122 IEEE Conference Publications.
Wilk, et al., "The Potential of Social-Aware Multimedia Prefetching on Mobile Devices", 2015 International Conference and Workshops on Networked Systems (NetSys) Year: 2015, pp. 1-5, DOI: 10.1109/NetSys.2015.7089081 IEEE Conference Publications.
Brecheisen, et al., "Hierarchical Genre Classification for Large Music Collections", ICME 2006, pp. 1385-1388.
Chuan-Yu Cho, et al., "Efficient Motion-Vector-Based Video Search Using Query by Clip", 2004, IEEE, Taiwan, pp. 1-4.
Ihab Al Kabary, et al., "SportSense: Using Motion Queries to Find Scenes in Sports Videos", Oct. 2013, ACM, Switzerland, pp. 1-3.
Jianping Fan et al., "Concept-Oriented Indexing of Video Databases: Towards Semantic Sensitive Retrieval and Browsing", IEEE, vol. 13, No. 7, Jul. 2004, pp. 1-19.
Shih-Fu Chang, et al., "VideoQ: A Fully Automated Video Retrieval System Using Motion Sketches", 1998, IEEE New York, pp. 1-2.
Wei-Te Li et al., "Exploring Visual and Motion Saliency for Automatic Video Object Extraction", IEEE, vol. 22, No. 7, Jul. 2013, pp. 1-11.
Gomes et al., "Audio Watermaking and Fingerprinting: For Which Applications?" University of Rene Descartes, Paris, France, 2003.
Zhu et al., Technology-Assisted Dietary Assessment. Computational Imaging VI, edited by Charles A. Bouman, Eric L. Miller, Ilya Pollak, Proc. of SPIE-IS&T Electronic Imaging, SPIE vol. 6814, 681411, Copyright 2008 SPIE-IS&T. pp. 1-10.
Johnson, John L., "Pulse-Coupled Neural Nets: Translation, Rotation, Scale, Distortion, and Intensity Signal Invariance for Images." Applied Optics, vol. 33, No. 26, 1994, pp. 6239-6253.
The International Search Report and the Written Opinion for PCT/US2016/050471, ISA/RU, Moscow, RU, dated May 4, 2017.
The International Search Report and the Written Opinion for PCT/US2017/015831, ISA/RU, Moscow, Russia, dated Apr. 20, 2017.
Zou, et al., "A Content-Based Image Authentication System with Lossless Data Hiding", ICME 2003, pp. 213-216.
Hua, et al., "Robust Video Signature Based on Ordinal Measure", Image Processing, 2004. 2004 International Conference on Image Processing (ICIP), vol. 1, IEEE, pp. 685-688, 2004.
Queluz, "Content-Based Integrity Protection of Digital Images", SPIE Conf. on Security and Watermarking of Multimedia Contents,

(56) References Cited

OTHER PUBLICATIONS

San Jose, Jan. 1999, pp. 85-93, downloaded from http://proceedings.spiedigitallibrary.org/ on Aug. 2, 2017.
Schneider, et. al., "A Robust Content Based Digital Signature for Image Authentication", Proc. ICIP 1996, Laussane, Switzerland, Oct. 1996, pp. 227-230.
Yanagawa, et al., "Columbia University's Baseline Detectors for 374 LSCOM Semantic Visual Concepts." Columbia University ADVENT technical report, 2007, pp. 222-2006-8.
Zhu et al., "Technology-Assisted Dietary Assesment", Proc SPIE. Mar. 20, 2008, pp. 1-15.
Hogue "Tree Pattern Inference and Matching for Wrapper Induction on the World Wide Web", Master's Thesis, Massachusetts institute of Technology, 2004, pp. 1-106.
Marian Stewart B et al., "Independent component representations for face recognition", Proceedings of the SPIE Symposium on Electronic Imaging: Science and Technology; Conference on Human Vision and Electronic Imaging, III San Jose, California, Jan. 1998, pp. 1-12.
Vallet et al., "Personalized Content Retrieval in Context Using Ontological Knowledge", IEEE Transactions on Circuits and Systems for Video Technology, vol. 17, No. 3, March 2007. pp. 336-346.
Li et al., "Matching Commercial Clips from TV Streams Using a Unigue, Robust and Compact Signature", IEEE 2005, pp. 1-8.
Big Bang Theory Series 04 Episode 12, aired Jan. 6, 2011; [retrieved from Internet: <https://bigbangtrans.wordpress.com/series-4-episode-12-the-bus-pants-utilization/>].
Wang et al., "Classifying Objectionable Websites Based onImage Content", Stanford University, pp. 1-12.
Ware et al, "Locating and Identifying Components in a Robot's Workspace using a Hybrid Computer Architecture" Proceedings of the 1995 IEEE International Symposium on Intelligent Control, Aug. 27-29, 1995, pp. 139-144.
Ortiz-Boyer et al, "CIXL2: A Crossover Operator for Evolutionary Algorithms Based on Population Features", Journal of Intelligence Research 24 (2005) Submitted 11 /04; published 07/05, pp. 1-48.
Scheper et al, "Nonlinear dynamics in neural computation", ESANN'2006—proceedings—European Symposium on Artificial Neural Networks, Bruges (Belgium), Apr. 26-28, 2006, d-side publication, ISBN 2-930307-06-4, pp. 1-12.
Lyon, "Computational Models of Neural Auditory Processing", IEEE International Conference on Acoustics, Speech, and Signal Processing, ICASSP '84, Date of Conference: Mar. 1984, vol. 9, pp. 41-44.
Boari et al, "Adaptive Routing for Dynamic Applications in Massively Parallel Architectures", 1995 IEEE, Spring 1995, pp. 1-14.
Cernansky et al, "Feed-forward Echo State Networks", Proceedings of International Joint Conference on Neural Networks Montreal, Canada, Jul. 31-Aug. 4, 2005, pp. 1-4.
Fathy et al, "A Parallel Design and Implementation for Backpropagation Neural Network Using MIMD Architecture", 8th Mediterranean Electrotechnical Conference, 19'96. Melecon '96, Date of Conference: May 13-16, 1996, vol. 3 pp. 1472 - 1475, vol. 3.
Freisleben et al, "Recognition of Fractal Images Using a Neural Network", Lecture Notes in Computer Science 1993, vol. 6861, 1993, pp. 631-637.
Garcia, "Solving the Weighted Region Least Cost Path Problem Using Transputers", Naval Postgraduate School, Monterey, California, Dec. 1989.
Howlett et al., "A Multi-Computer Neural Network Architecture in a Virtual Sensor System Application", International journal of knowledge-based intelligent engineering systems, 4 (2). pp. 86-93, 133N 1327-2314.
May et al., "The Transputer", Springer-Verlag Berlin Heidelberg 1989, vol. 41.
Nagy et al, "A Transputer, Based, Flexible, Real-Time Control System for Robotic Manipulators", UKACC International Conference on Control '96, Sep. 2-5, 1996, Conference Publication No. 427, IEE 1996.
Theodoropoulos et al, "Simulating Asynchronous Architectures on Transputer Networks", Proceedings of the Fourth Euromicro Workshop on Parallel and Distributed Processing, 1996. PDP '96, pp. 274-281.
Verstraeten et al, "Isolated word recognition with the Liquid State Machine: a case study", Department of Electronics and Information Systems, Ghent University, Sint-Pietersnieuwstraat 41, 9000 Gent, Belgium, Available online Jul. 14, 2005, pp. 521-528.
Whitby-Strevens, "The transputer", 1985 IEEE, pp. 292-300.
Zhou et al, "Ensembling neural networks: Many could be better than all", National Laboratory for Novel Software Technology, Nanjing University, Hankou Road 22, Nanjing 210093, PR China Received Nov. 16, 2001, Available online Mar. 12, 2002, pp. 239-263.
Zhou et al, "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.
Hua et al., "Robust Video Signature Based on Ordinal Measure", International Conference on Image Processing (ICIP), 2004 IEEE, pp. 685-688.
Yanagawa et al, "Columbia University's Baseline Detectors for 374 LSCOM Semantic Visual Concepts", Columbia University Advent Technical Report # 222-2006-8, Mar. 20, 2007, pp. 1-17.
Lu et al., "Structural Digital Signature for Image Authentication: An Incidental Distortion Resistant Scheme", IEEE Transactions on Multimedia, vol. 5, No. 2, Jun. 2003, pp. 161-173.

* cited by examiner

SYSTEM AND METHOD FOR IDENTIFICATION OF INAPPROPRIATE MULTIMEDIA CONTENT

CROSS-REFERENCE TO RELATED APPLICATIONS

This application claims the benefit of U.S. Provisional Application No. 61/839,885 filed on Jun. 27, 2013. This application is a continuation-in-part (CIP) of:

(a) U.S. patent application Ser. No. 13/770,603 filed on Feb. 19, 2013, now pending, which is the National Stage of International Application No. PCT/IL2006/001235 filed on Oct. 26, 2006, which claims foreign priority from Israeli Application No. 171577 filed on Oct. 26, 2005 and Israeli Application No. 173409 filed on 29 Jan. 2006. The Ser. No. 13/770,603 application is also a continuation-in-part of U.S. patent application Ser. No. 13/624,397 filed on Sep. 21, 2012, now pending. The Ser. No. 13/624,397 application is a continuation-in-part of U.S. patent application Ser. No. 13/344,400 filed on Jan. 5, 2012, now pending, which is a continuation of U.S. patent application Ser. No. 12/434,221 filed May 1, 2009, now U.S. Pat. No. 8,112,376. The Ser. No. 13/344,400 application is also a continuation-in-part of the below-referenced U.S. patent application Ser. No. 12/084,150; and the below-referenced U.S. patent application Ser. No. 12/195,863;

(b) U.S. patent application Ser. No. 12/603,123 filed on Oct. 21, 2009, now U.S. Pat. No. 8,266,185, which is a continuation-in-part of the below-referenced U.S. patent application Ser. No. 12/084,150; the below-referenced U.S. patent application Ser. No. 12/195,863; U.S. patent application Ser. No. 12/348,888 filed Jan. 5, 2009, now pending; and U.S. patent application Ser. No. 12/538,495 filed Aug. 10, 2009, now U.S. Pat. No. 8,312,031. The Ser. No. 12/348,888 application is a continuation-in-part of the below-referenced U.S. patent application Ser. No. 12/084,150 and the below-referenced U.S. patent application Ser. No. 12/195,863. The Ser. No. 12/538,495 application is a continuation in part of the below-referenced U.S. patent application Ser. No. 12/084,150, the below-referenced U.S. patent application ser. No. 12/195,863, and the above-referenced U.S. patent application Ser. No. 12/348,888;

(c) U.S. patent application Ser. No. 12/195,863 filed on Aug. 21, 2008, now U.S. Pat. No. 8,326,775, which claims priority under 35 USC 119 from Israeli Application No. 185414, filed on Aug. 21, 2007, and which is also a continuation-in-part of the below-referenced U.S. patent application Ser. No. 12/084,150; and (d) U.S. patent application Ser. No. 12/084,150 having a filing date of Apr. 7, 2009, now U.S. Pat. No. 8,655,801, which is the National Stage of International Application No. PCT/IL2006/001235, filed on Oct. 26, 2006, which claims foreign priority from Israeli Application No. 171577 filed on Oct. 26, 2005 and Israeli Application No. 173409 filed on 29 Jan. 2006.

All of the applications referenced above are herein incorporated by reference for all that they contain.

TECHNICAL FIELD

The present invention relates generally to the analysis of multimedia content, and more specifically to a system for identifying inappropriate elements in the multimedia content.

BACKGROUND

Due to the abundance of multimedia content made available through various means and, in particular, through the Internet, there is a need to provide effective filters in order to prevent the exposure of inappropriate content to users. The definition of inappropriate content is subjective and depends on the perspective of each person who may view such content. The differences among definitions of "inappropriate" are usually derived from a person's characteristics such as age, geographic location, religion, background, and the like. In some cases, a person or his or her supervisor may wish to control the content made available to such person.

A user or supervisor of that user may want to prevent the user from being exposed to certain portions of content. In such cases, the user and/or supervisor may desire to prevent display of such portions of content in multimedia content. As an example, a doctor may seek to prevent a pedophile from being exposed to images containing content related to infants as part of a medical treatment. As another example, a smoker who is currently undergoing rehabilitation may not want to be exposed to images containing content related to cigarettes and people smoking. As yet another example, a parent may wish to prevent his or her child from accessing content featuring excessively violent imagery and/or written or spoken foul language. Despite these needs to prevent the display of certain elements in multimedia content, such elements are still widely accessible and may be encountered in a variety of situations.

Prior art solutions for preventing exposure to certain content which are commonly used by search engines include methods for searching and identifying inappropriate sources of content such as, for example porn websites, and preventing the display of content received from such sources. The existing solutions typically filter inappropriate content based on, for example, URLs of websites tagged as inappropriate, content classification using textual and attributes analysis of the web-pages, and so on. Content retrieved from sources other than web-pages are typically scanned for viruses but not for the nature of the content.

Current solutions for content filtering are typically inefficient in cases where inappropriate content is received from a source which is not classified as inappropriate by the search engine. Furthermore, as the content available in the Internet continues to grow exponentially, the task of identifying every inappropriate source of inappropriate content has become increasingly difficult.

It would therefore be advantageous to provide a solution that would overcome the deficiencies of the prior art by providing an efficient and dynamic tool for preventing users from being exposed to inappropriate content.

SUMMARY

Certain embodiments disclosed herein include a method and system. The method includes a method for identification of inappropriate multimedia content elements. The method comprises receiving a request to identify a multimedia content element from a user device; generating at least one signature respective of the received multimedia content element; matching between the at least one of generated signature respective of the multimedia content element and at least one signature of each concept designated as inappropriate; determining whether a match is identified between the at least one of signature generated respective of the multimedia content element and the at least one signature of an inappropriate concept; and preventing the display on a user device of the multimedia content element, upon identification of a match.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
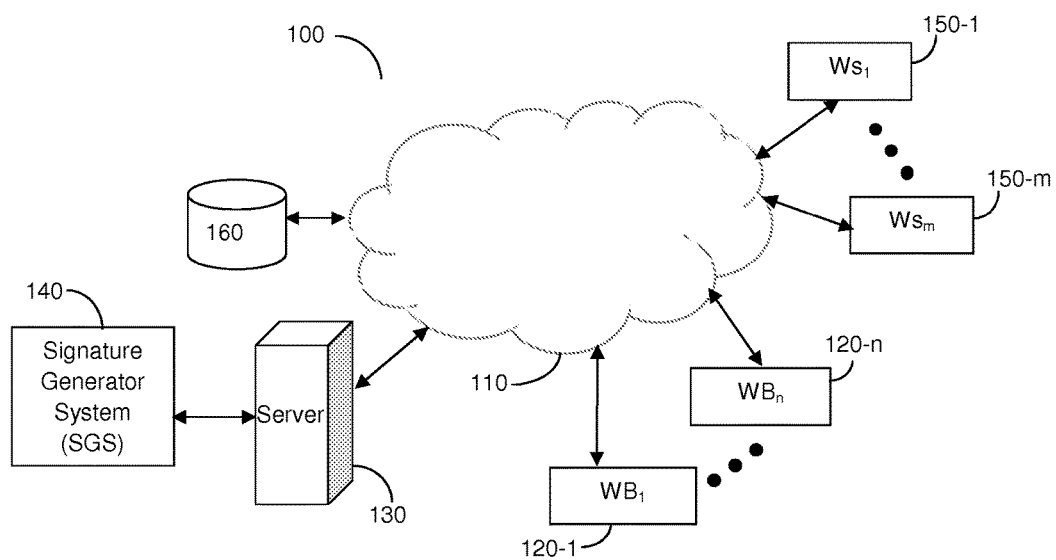
FIG. 1 is a schematic block diagram of a system utilized to describe the various embodiments for identifying inappropriate multimedia content elements.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Certain exemplary embodiments disclosed herein include a system and method for identifying inappropriate elements within multimedia content. According to one embodiment, inappropriate multimedia elements may be determined based on a user's characteristics and/or a user's preferences. According to another embodiment, one or more preferences may be preconfigured by a user's supervisor. According to the embodiments disclosed herein, identification of a multimedia element or portion thereof as inappropriate is based on signatures matching. In an exemplary embodiment, the matching is between at least one signature generated for a received multimedia element and at least one signature of a concept determined as inappropriate. According to one embodiment, when a match is identified, a display of the inappropriate element may be prevented.

FIG. 1 shows an exemplary and non-limiting schematic diagram of a system 100 for identifying inappropriate multimedia content elements according to one embodiment. A network 110 is used to communicate between different parts of the system 100. The network 110 may be the Internet, the world-wide-web (WWW), a local area network (LAN), a wide area network (WAN), a metro area network (MAN), and other networks capable of enabling communication between the elements of the system 100.

Further connected to the network 110 are one or more client applications, such as web browsers (WB) 120-1 through 120-n (collectively referred to hereinafter as web browsers 120 or individually as a web browser 120, merely for simplicity purposes). A web browser 120 may be executed over a computing device of a user or over a computing device of a user's supervisor. In certain embodiments, the web browser 120 may be a mobile application ('app'), a plug-in, an ad-on, and the like. The computing device may be, but is not limited to, a personal computer (PC), a personal digital assistant (PDA), a mobile phone, a smart phone, a tablet computer, a wearable computing device, and other kinds of wired and mobile appliances, equipped with browsing, viewing, listening, filtering, and managing capabilities etc., that are enabled as further discussed herein below.

A server 130 is further connected to the network 110. The server 130 may provide web-pages containing multimedia content, or references therein, to a web browser 120 upon request. The system 100 also includes a signature generator system (SGS) 140. In one embodiment, the SGS 140 is connected to the server 130. In another embodiment, the SGS 140 is implemented in the server 130. In yet another embodiment, the server 130 is configured to receive and serve multimedia content and causes the SGS 140 to generate a signature respective of the multimedia content.

It should be noted that each of the server 130 and the SGS 140 typically includes a processing unit such as a processor (not shown) that is coupled to a memory. The memory typically contains instructions that can be executed by the processor.

A plurality of web sources 150-1 through 150-m are also connected to the network 110, each of which is a source for multimedia content. For example, a web source 150-1 may be a web server hosting web pages, a web source 150-2 may be a server hosting mobile application, a web source 150-m may be a repository for medical records, and the like. The web sources 150-1 through 150-m are accessible to the server 130 through the network 110. A data storage unit, such as a data warehouse 160, may be utilized at least for maintaining inappropriate concepts together with at least one signature respective thereto.

A concept is a collection of signatures representing multimedia elements of the unstructured data and metadata describing the concept. As a non-limiting example, a 'Superman concept' is a signature reduced cluster of signatures describing elements (such as multimedia elements) related to, e.g., a Superman cartoon: a set of metadata representing textual representation of the Superman concept. Therefore, the concept can provide a unique identification of the multimedia content input. A concept is an abstract description of the content to which the signature was generated. For example, a concept of the signature generated for a picture showing a bouquet of red roses is "flowers." A cluster reduction process for generating a signature reduced cluster is performed. Specifically, the purpose of the operation is to ensure that in the cluster there remains the minimal number of signatures that still identify all of the MMDEs that are associated with the signature reduced cluster (SRC). This can be performed, for example, by attempting to match the signatures of each of the MMIDEs associated with the SRC having one or more signatures removed there from. In one embodiment of the invention the process of cluster reduction for the purpose of generating SRCs is performed in parallel and independently of the process described herein above.

With respect to clustered signatures related to multimedia elements, a concept is a match that is common among one or more multimedia elements. Concept generation and identification is discussed in more detail in the U.S. Pat. No. 8,266,185, assigned to common assignee, which is hereby incorporated by reference for all that it contains.

Inappropriate concepts are concepts that relate to subject matter that may be inappropriate in certain situations determined by a user and/or supervisor. As a non-limiting example, with respect to a smoker who recently quit smoking, inappropriate concepts may include, but are not limited to, cigarettes, people smoking, and the like. As another non-limiting example, a parent (i.e. a supervisor) of a child may find foul language, violence, and nudity inappropriate for his or her child. In such a case, inappropriate concepts may include, but are not limited to, curse words, weapons, blood, and modest body parts.

Concepts may be identified as inappropriate when, e.g., a signature of the concept matches signatures of one or more inappropriate concepts. As a non-limiting example for a smoker who recently quit smoking, portions of an image illustrating a pack of cigarettes may be inappropriate content found within the multimedia content.

The data warehouse 160 is typically connected to the server 130 either directly or through the network 110. In some embodiments, the at least one inappropriate concept may be received or retrieved from a user, another data source, and so on.

According to the embodiments disclosed herein, a multimedia element is received by the server 130. The multimedia element can be generated and sent by a script executed in a web-page, an agent installed in the web-browser, or by one of the web sources 150. The request to analyze the multimedia element may include a URL of the web-page or a copy of the web-page. Moreover, the multimedia element may be extracted from the web-page. A multimedia element may be, but is not limited to, an image, a graphic, a video stream, a video clip, an audio stream, an audio clip, a video frame, a photograph, and an image of signals (e.g., spectrograms, phasograms, scalograms, etc.), and/or combinations thereof and portions thereof.

The server 130 is configured to analyze the multimedia content to identify the multimedia elements shown in it. Then, the server 130 is configured to generate by the SGS 140 at least one signature for each multimedia element. The generated signature(s) may be robust to noise and distribution as discussed below. Each signature represents a concept to be tested in order to identify whether it is an appropriate concept. In an embodiment, the tested concept may be identified as inappropriate if its signature matches the signature(s) of one or more predetermined inappropriate concepts. A concept may be predetermined to be inappropriate when, e.g., the concept is designated by a user or supervisor as inappropriate. In another embodiment, the concept may be determined as inappropriate based on a user's characteristics received from a user or a supervisor. As noted herein, each concept has a signature representing the concept.

In an embodiment, the server 130 is further configured to correlate the generated signature(s) to the at least one signature of a predetermined inappropriate concept. The correlation between concepts can be achieved by identifying a ratio between signatures' sizes, a spatial location of each signature, and so on using probabilistic models. A strong match is determined when there are more concepts, or when the each concept of the plurality of concepts satisfies the same predefined condition as other concepts of the plurality of concepts.

As a non-limiting example, a curse word may be predetermined by a supervisor as an inappropriate concept. The signature(s) associated with the curse word may be stored, e.g., in the data warehouse 160. A multimedia content is received containing various words. Signature(s) may be generated for each word. The signatures of the words are each compared to the signature(s) of the predetermined inappropriate concept. In this example, one of the signatures generated for the words contained in the multimedia content matches the signature(s) of the predetermined inappropriate concept. Thus, the word associated with that signature(s) may be identified as related to an inappropriate concept.

Each inappropriate concept may be retrieved with its respective one or more signatures from the data warehouse 160, from the web browser 120, from the user's supervisor device, and so on. According to one embodiment, the server 130 is configured to generate at least one signature respective of each inappropriate concept received by the SGS 140. In a further embodiment, retrieval of such signature(s) respective of an inappropriate concept may be unnecessary.

In one embodiment, upon identification of at least one match between the inappropriate concept and the concept needed to be tested, the server 130 is configured to block the concept that is found to be inappropriate and/or the multimedia content element thereof. It should be noted that blocking the inappropriate concept may involve, but is not limited to, removing the inappropriate concept, occluding the inappropriate concept, making the inappropriate concept blurred and so on.

Figure 2:
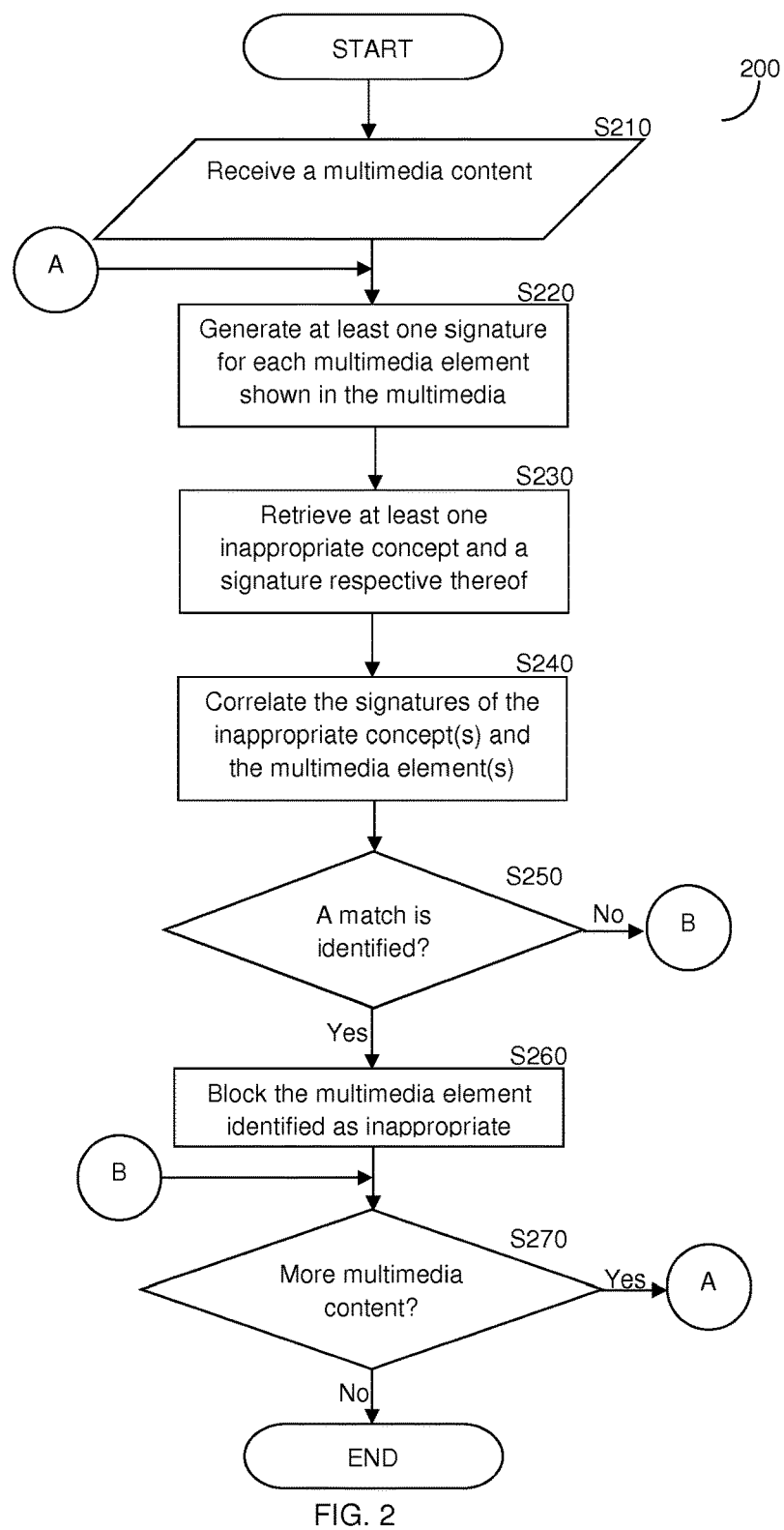
FIG. 2 is a flowchart illustrating a method for preventing exposure of a user to inappropriate multimedia elements according to an embodiment.

FIG. 2 depicts an exemplary and non-limiting flowchart 200 illustrating a method of identifying an inappropriate concept within a multimedia content element according to one embodiment. Inappropriate concepts are discussed further herein above with respect to FIG. 1. In S210, a multimedia element is received. Such a multimedia element may be, but is not limited to, an image, graphics, a video stream, a video clip, an audio stream, an audio clip, a video frame, a photograph, images of signals, combinations thereof, and portions thereof. The multimedia element may be received from a script running on an uploaded web-page, a web-browser (e.g., web-browser 120), and the like. S210 may also involve extraction of the multimedia element from the web-page and identification of one or more multimedia elements shown therein.

In S220, at least one signature is generated respective of the multimedia content element or portion thereof. Signature generation is described further herein below with respect to FIGS. 3 and 4. Each signature represents a concept to be tested. A concept is an abstract description of a multimedia content element to which at least one signature is generated. As an example, a concept of the signature generated for a picture showing a bouquet of red roses is "flowers." As another example, a concept of a bouquet of wilted roses is "wilted flowers." Concept generation and identification is discussed in more detail in U.S. Pat. No. 8,266,185 referenced above.

In S230, at least one predetermined inappropriate concept is retrieved together with at least one signature. The predetermined inappropriate concept may be, but is not limited to, body parts, text content, objects, symbols, locations, and so on. In various embodiments, the predetermined inappropriate concept and/or its signature(s) may be received from a user via a user device (e.g., the web browser 120), from a user's supervisor via a supervisor user device (not shown), and so on. In various other embodiments, the signature respective of the predetermined inappropriate concept may not be retrieved. Rather, in such embodiments, the predetermined inappropriate concept alone (without any signature) may be retrieved. Each concept includes at least one signature representing the concept regardless of whether the concept is appropriate or inappropriate.

According to an embodiment, an inappropriate concept may be adjusted based on a user's characteristics. The user's characteristics may be, but are not limited to, age, geographic location, religion, background, and so on.

According to another embodiment, one or more inappropriate concepts may be received as an input from a user device (e.g., web browser 120) or, alternatively, may be received as an input from a user's supervisor's device. The user's supervisor may be an authority which desires to prevent display of inappropriate concepts to the user. A supervisor may be, but is not limited to, a parent, a guardian, an employer, a manager, and the like.

It should be understood that each inappropriate concept is retrieved, received or predetermined respective of the user's characteristics. Then, each inappropriate concept is analyzed, and at least one signature is generated respective thereto. The signatures together with the inappropriate concept may be stored for further use.

In S240, the at least one signature generated respective of the multimedia content is correlated to at least one signature that represents a predetermined inappropriate concept to determine whether a match is found respective thereof. The correlation or other matching between a multimedia element and an inappropriate concept can be achieved by identifying a ratio between signatures' sizes, a spatial location of each signature, and so on using probabilistic models. A strong match may be determined, for example, when there are more concepts, or when each concept of the plurality of concepts satisfies the same predefined condition as each other concept of the plurality of concepts.

In S250, it is checked whether a match is found and, if so, execution continues with S260; otherwise, execution terminates. In S260, at least one multimedia element identified as inappropriate is blocked. Blocking may include, but is not limited to, removal of the identified inappropriate concept, occluding the identified inappropriate concept, or blurring of the identified inappropriate concept. In S270, it is checked whether additional multimedia content have been received and, if so, execution continues with S210; otherwise, execution terminates.

As a non-limiting example, a multimedia content element that is a video clip of the singer "Madonna" is received and signatures are generated respective thereto. The signatures may be generated for example, for the "cone bra", "blond hair", "crucifix", "audience", "stage", "dancers", and so on. According to this example, the user who desires to view the video clip is a 6 year-old boy from. Consequently, several signatures of predetermined inappropriate concepts adjusted to the user characteristics are retrieved from a database (e.g., data warehouse 160) including the predetermined inappropriate concepts of "bra" and of "crucifix."

The signatures generated for the video clip are correlated with the signatures associated with each predetermined inappropriate concepts. A match is found with the predetermined inappropriate concept of "bra" with respect to the cone bra which appears in the video clip and the inappropriate concept of "crucifix" with respect to the crucifix which appears in the video clip. In accordance with the embodiments disclosed herein, probabilistic models may be used to identify that the signatures' sizes of "bra" is similar to "cone bra." Moreover, a spatial location of the signature of "cone bra" is found on Madonna and it covers her upper body, when the "bra" is worn by Madonna, thereby signaling a match to the predetermined inappropriate concept. Upon matching signatures in the video to signatures of predetermined inappropriate concepts, the "crucifix" and the "cone bra" found in the video clip are blocked via blurring.

According to one embodiment, the context of the multimedia content element may be determined. A context is determined by analyzing the multimedia elements shown in the multimedia content. Context determination is described further herein below with respect to FIG. 5. Based on this determination, it is determined whether the context of the multimedia content is inappropriate. Moreover, a notification may be sent to the user's supervisor if the context of the multimedia content is found to be inappropriate.

Figure 3:
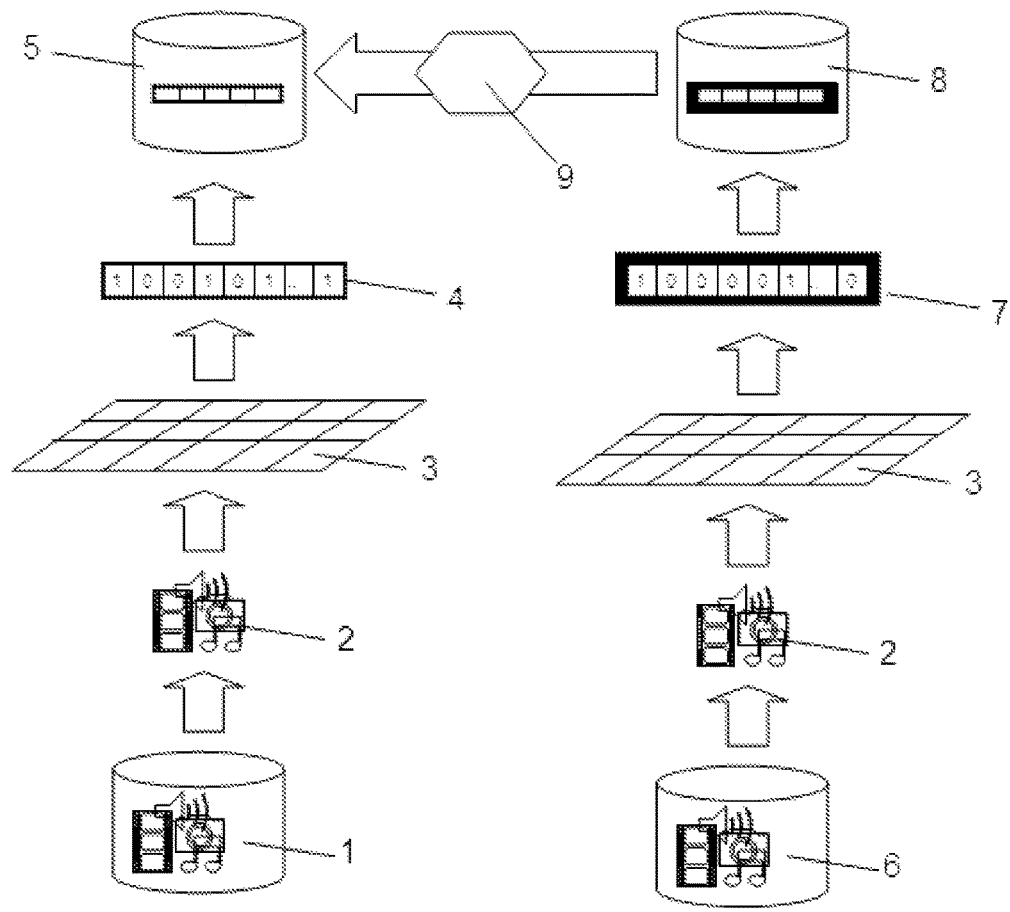
FIG. 3 is a block diagram depicting the basic flow of information in a signature generator system.
Figure 4:
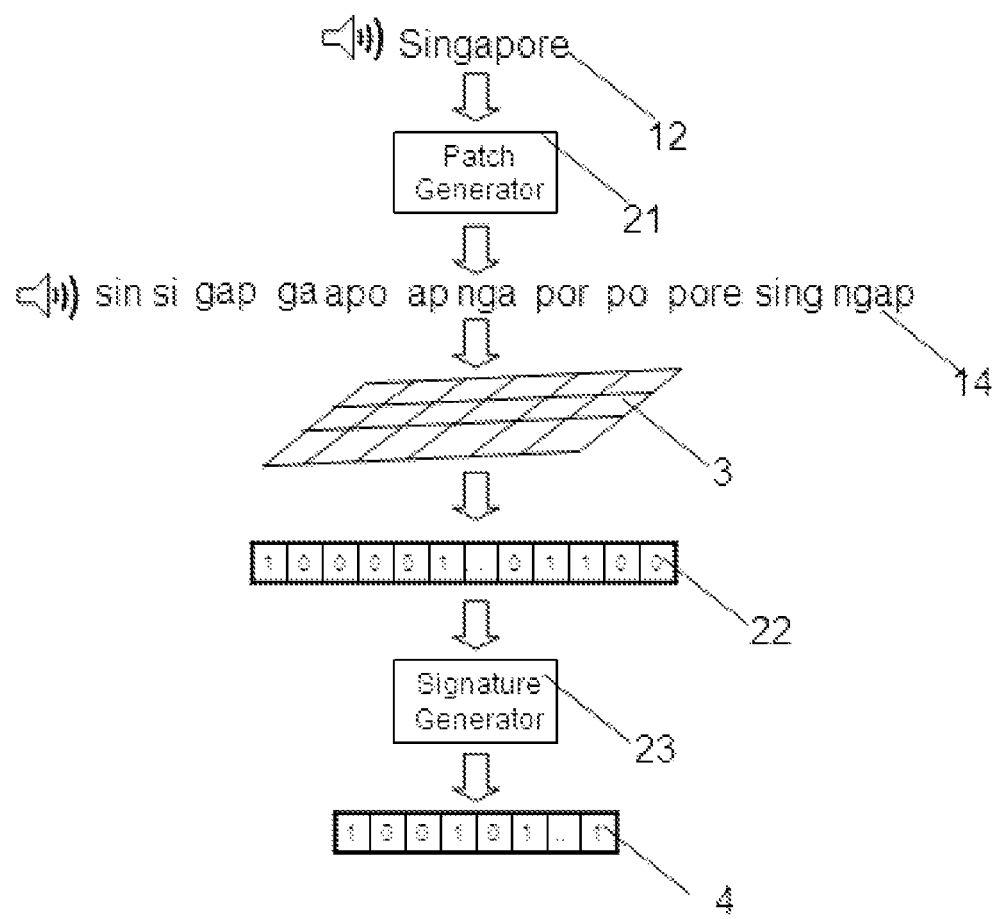
FIG. 4 is a diagram illustrating the flow of patches generation, response vector generation, and signature generation in a large-scale speech-to-text system.

FIGS. 3 and 4 illustrate the generation of signatures for the multimedia content elements by the SGS 140 according to one embodiment. An exemplary high-level description of the process for large scale matching is depicted in FIG. 3. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Finally, Target Robust Signatures and/or Signatures are effectively matched, by a matching algorithm 9, to Master Robust Signatures and/or Signatures database to find all matches between the two databases.

The Signatures' generation process will now be described with reference to FIG. 4. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the server 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame 'i' is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $C_i = \{n_i\}$ ($1 \leq i \leq L$) may consist of a single leaky integrate-to-threshold unit (LTU) node or more nodes. The node $n_i$ equations are:

$$V_i = \sum_j w_{ij} k_j \quad n_i = \Theta(V_i - Th_x)$$

where, $\Theta$ is a Heaviside step function; $w_{ij}$ is a coupling node unit (CNU) between node i and image component j (for example, grayscale value of a certain pixel j); $k_j$ is an image component 'j' (for example, grayscale value of a certain pixel j); Thx is a constant Threshold value, where x is 'S' for Signature and 'RS' for Robust Signature; and Vi is a Coupling Node Value.

The Threshold values Thx are set differently for Signature generation and for Robust Signature generation. For example, for a certain distribution of Vi values (for the set of nodes), the thresholds for Signature (ThS) and Robust Signature (Th$_{RS}$) are set apart, after optimization, according to at least one or more of the following criteria:

1: For: $V_i > Th_{RS}$ $1 - p(V > Th_s) - 1 - (1 - \in)^l \ll 1$ i.e., given that nodes (cores) constitute a Robust Signature of a certain image I, the probability that not all of these I nodes will belong to the Signature of same, but noisy image, Ĩ is sufficiently low (according to a system's specified accuracy).

2: $p(V_i > Th_{RS}) \approx l/L$ i.e., approximately l out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. Detailed description of the Signature generation is discussed in more detail in the co-pending patent applications of which this patent application is a continuation-in-part, which are hereby incorporated by reference.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the

Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

Detailed description of the Computational Core generation and the process for configuring such cores is discussed in more detail in the above-referenced U.S. Pat. No. 8,655, 801, assigned to the common assignee, which is hereby incorporated by reference for all that it contains.

Figure 5:
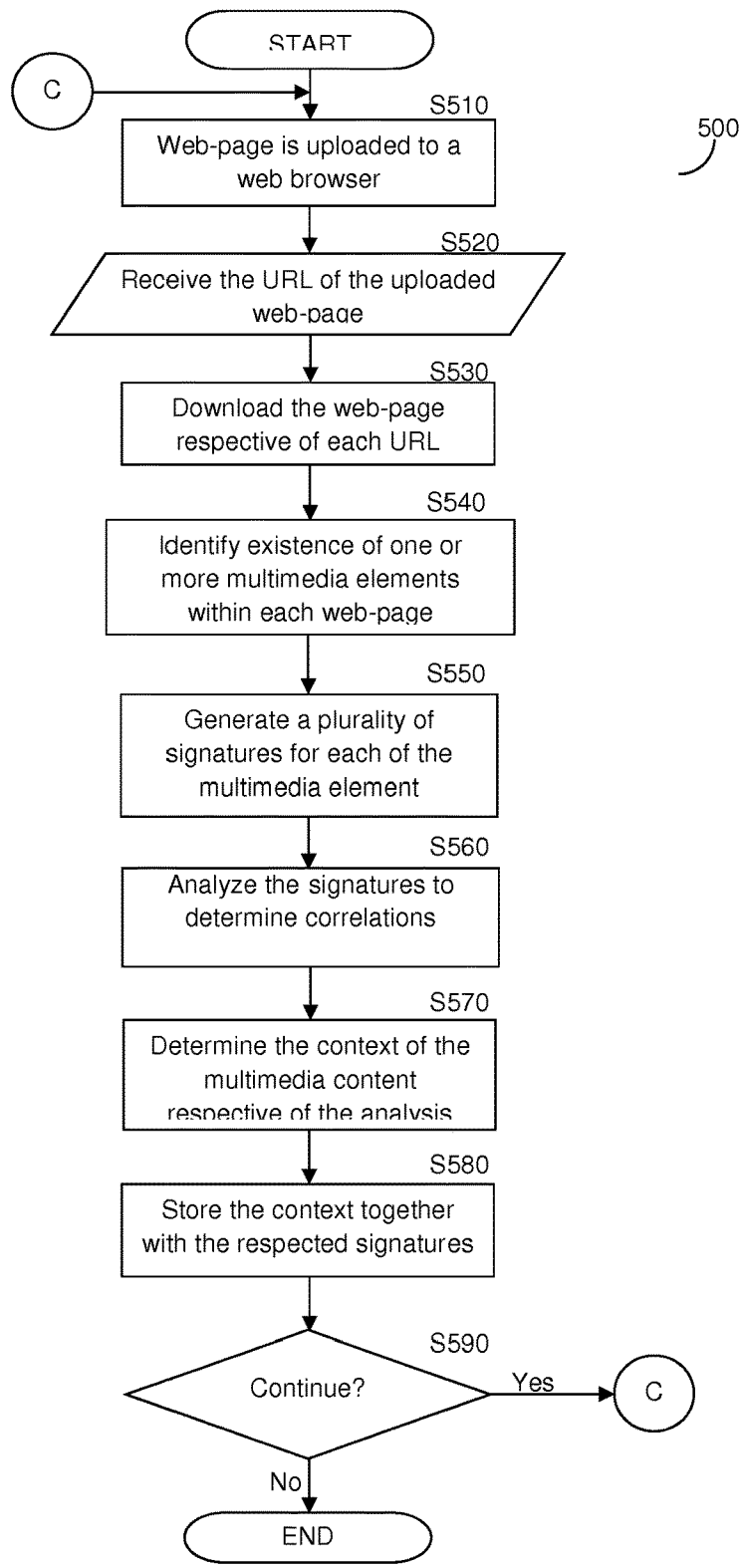
FIG. 5 is a flowchart illustrating a method for determining the context indicated by the relationship between multimedia elements according to an embodiment.

FIG. 5 is a flowchart 500 illustrating determination of a context of a multimedia content element retrieved from a web-page. In S510, the method starts when a web-page is uploaded to a web-browser (e.g., web-browser 120-1). In another embodiment, the method starts when a web server (e.g., web-browser 150-1) receives a request to host the requested web-page.

In S520, a uniform resource locator (URL) of the web-page to be processed is received. In an embodiment, the uploaded web-page includes an embedded script. In that embodiment, the script extracts the URL of the web-page and may send the URL to a server (e.g., the server 130). In another embodiment, an add-on installed in a web-browser (e.g., the web browser 120) may extract the URL of the uploaded web-page and send the URL to a server. In yet another embodiment, an agent may be installed on a user device (e.g., user device 120) executing a web browser. The agent is configured to monitor web-pages uploaded to the web-site, extract the URLs, and send them to the server. In another embodiment, the web-server (e.g., an information source 150-1) hosting the requested web-page provides the server with the URL of the requested web-page. It should be noted that only URLs of selected web sites can be sent to the server such as, for example, URLs related to web-sites that paid for the additional information.

In S530, the web-page respective of each received URL is downloaded. In S540, each downloaded web-page is analyzed in order to identify the existence of one or more multimedia elements in the uploaded web-page. Each identified multimedia element is extracted from the web-page and, in an embodiment, may be sent to a SGS (e.g., the SGS 140). In S550, at least one signature is generated for each identified multimedia element. The at least one signature is robust for noise and distortion. The signatures for the multimedia elements are generated as described in greater detail herein above with respect to FIGS. 3 and 4.

In S560, the correlation between the signatures of all extracted multimedia elements and between any identified inappropriate concepts is determined. It should be noted that each signature represents a different concept. The signatures are analyzed to determine the correlation between concepts. A concept is an abstract description of the content to which the signature was generated. For example, a concept of the signature generated for a picture showing a bouquet of red roses is "flowers". The correlation between concepts can be achieved by identifying a ratio between signatures' sizes, a spatial location of each signature, and so on using probabilistic models. As noted above, a signature represents a concept and is generated for a multimedia element. Thus, identifying, for example, the ratio of signatures' sizes may also indicate the ratio between the sizes of their respective multimedia elements.

A context is determined as the correlation between the concepts. A strong context may be determined when there are multiple correlation matches among concepts, or when each concept of a plurality of concepts satisfies the same predefined condition. As an example, the server (each server 130) is configured to analyze signatures generated for multimedia elements of a smiling child with a Ferris wheel in the background. The concept of the signature of the smiling child is "amusement" and the concept of a signature of the Ferris wheel is "amusement park". The server 130 further analyzes the relation between the signatures of the child and recognized wheel, to determine that the Ferris wheel is bigger than the child. The relation analysis determines that the Ferris wheel is used to entertain the child. Therefore, the determined context may be "amusement."

According to one embodiment, one or more typical probabilistic models may be used to determine the correlation between signatures representing concepts. The probabilistic models may determine, for example, the probability that a signature may appear in the same orientation and in the same ratio as another signature. When performing the analysis, information maintained in a database (e.g., the data warehouse 160) may be utilized such as, for example, signatures previously analyzed. In such embodiments, a match may be determined if, for example, two signatures appear in the same orientation when the probability of such orientation is low (e.g., 10%, 1%, 0.1%, etc.).

In S570, based on the analysis performed in S560, the context of a plurality of multimedia elements that exist in the multimedia content and in the context of the web-page is determined. If there is a strong correlation between multimedia elements in the web-page and one or more predetermined inappropriate concepts, the context of the multimedia content showing strong correlations may be "inappropriate." In S580, the context of the multimedia content together with the respective signatures is stored for future use.

In an embodiment, S580 may further include, upon determining that the context of the multimedia element is "inappropriate," identifying that the web-page features inappropriate content. In further embodiments, such inappropriate content may be blocked to that user and/or may be flagged as inappropriate for other users. Flagging a web-page as inappropriate may involve, but is not limited to, generating and sending a message to one or more search engines. This may allow other users to be warned of the web-page's content and/or to filter content on the web-page prior to viewing or listening to content on the web-page. In S590, it is checked whether there are additional web-pages to be analyzed and, if so, execution continues with S510; otherwise, execution terminates.

As a non-limiting example, an image that contains a plurality of multimedia elements is identified in an uploaded web-page. At least one signature is generated for each of the plurality of multimedia elements that exist in the image. According to this example, multimedia contents featuring the singer "Adele", the "red carpet," and a "Grammy" award are shown in the image. Signatures are generated respective thereto. The correlation between "Adele", "red carpet," and the "Grammy" award is analyzed, and the context of the image is determined based on the correlation. According to this example, such a context may be "Adele Wining the Grammy Award".

As another non-limiting example, a web page containing a plurality of multimedia elements is identified in an uploaded web-page. According to this example, signatures are generated for objects such as a "glass," a "cutlery," and a "plate" which appear in the multimedia elements. The correlation between the concepts generated by signatures respective of the data is then analyzed based on, for example, analysis of previously generated signatures. According to this example, since all of the concepts of "glass," "cutlery," and "plate" satisfy the same predefined condition (e.g., items commonly found on a table set), a strong context is determined. The context of such concepts may be determined to be a "table set." The context can also be determined respective of a ratio of the sizes of the objects (glass, cutlery, and plate) in the image and the distinction of their spatial orientation. For example, if the plate is determined to be slightly larger than the glass and the cutlery, and all of the items are placed close to each other within an image, the context may be determined to be a "table set." In contrast, if the cutlery is much larger than the plate and the items are all far apart within the image, the context may be determined to not be a "table set."

As yet another non-limiting example, a user seeks to visit a web-page featuring content related to the video game "Grand Theft Auto." In this example, the user is a 10-year-old child. The web-page is uploaded to a web browser and the URL of the uploaded web-page is received. The web-page associated with the URL is downloaded. The web-page features multimedia content showing, among other multimedia elements, a gun being fired. Signatures are generated respective thereto.

In accordance with an embodiment, the signatures are analyzed and correlation to one or more signatures of inappropriate concepts retrieved from a database (e.g., data warehouse 160). In this example, there is a strong correlation between the "gun being fired" element and the inappropriate concept "excessive violence" due to the presence of a gun and a bullet, the speed of the bullet exiting the gun, and the flash as the gun is fired. Consequently, the context of the multimedia content is determined as "excessive violence." The context and its respective signature are stored. In accordance with an embodiment, the web-page is identified as containing inappropriate content. Consequently, multimedia contents featuring a gun being fired on the web-page may be blocked, or the user may be denied access to the web-page entirely. Additionally, a message indicating the site's inappropriate content may be generated and sent to, e.g., Google@, Yahoo®, Bing®, and so on.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for identification of inappropriate multimedia content elements, comprising:
receiving a request to identify a multimedia content element from a user device;
generating at least one signature for the received multimedia content element;
matching between the at least one generated signature for the received multimedia content element and at least one signature of each of at least one inappropriate concept, wherein each inappropriate concept is a concept that is designated as inappropriate, wherein each of the at least one inappropriate concept is associated with a plurality of multimedia content elements, and includes a reduced cluster of signatures representing the plurality of multimedia content elements, and textual metadata related to the plurality of multimedia content elements;

determining whether a match is identified between the at least one signature generated for the received multimedia content element and the at least one signature of at least one inappropriate concept; and preventing a display on a user device of the received multimedia content element, upon identification of a match.

2. The method of claim 1, wherein the at least one inappropriate concept is determined based on a set of characteristics of a user of the user device.

3. The method of claim 2, wherein the characteristics of the user of the user device are at least one of: age, geographic location, religion, and background.

4. The method of claim 1, wherein each inappropriate concept is any of: retrieved from a data warehouse with its respective at least one signature, received as an input from a user device, and received as an input from a user's supervisor's device.

5. The method of claim 1, wherein the signatures representing the plurality of multimedia content elements represent responses of one or more neural networks to the plurality of multimedia content elements.

6. The method of claim 1, further comprising: generating the reduced cluster of signatures by performing a cluster reduction process that comprises reducing a number of signatures of the reduced cluster while remaining a minimal number of signatures to that still identify all of the plurality of multimedia content items.

7. The method of claim 1 comprising generating the at least one signature for received multimedia content by a plurality of at least partially statistically independent computational cores.

8. The method of claim 1, further comprising:
using at least one probabilistic model to determine whether the match is identified.

9. A non-transitory computer readable medium having stored thereon instructions for causing at least one processing unit to execute a method
for identification of inappropriate multimedia content elements, comprising: receiving a request to identify a multimedia content element from a user device; generating at least one signature for the received multimedia content element; matching between the at least one generated signature for the received multimedia content element and at least one signature of each of at least one inappropriate concept, wherein each inappropriate concept is a concept that is designated as inappropriate, wherein each of the at least one inappropriate concept is associated with a plurality of multimedia content elements, and includes a reduced cluster of signatures representing the plurality of multimedia content elements, and textual metadata related to the plurality of multimedia content elements; determining whether a match is identified between the at least one signature generated for the received multimedia content element and the at least one signature of at least one inappropriate concept; and preventing a display on a user device of the received multimedia content element, upon identification of a match.

10. A system for removal of an inappropriate concept, comprising: a network interface configured to receive a request to identify a multimedia content element from a user device; a processor; a memory communicatively connected to the processor, wherein the memory contains instructions that, when executed by the processor, configure the system to: generate at least one signature for the received multimedia content element; match between the at least one generated signature for the received multimedia content element and at least one signature of each of at least one inappropriate concept, wherein each inappropriate concept is a concept that is designated as inappropriate, wherein each of the at least one inappropriate concept ef is associated with a plurality of multimedia content elements, and includes a reduced cluster of signatures representing the plurality of multimedia content elements, and textual metadata related to the plurality of multimedia content elements; determine whether a match is identified between the at least one signature generated for the received multimedia content element and the at least one signature of at least one inappropriate concept; and prevent a display on a user device of the received multimedia content element, upon identification of a match.

11. The system of claim 10, wherein the system is communicatively connected to a data warehouse for maintaining the at least one inappropriate concept with its respective at least one signature.

12. The system of claim 10, wherein each inappropriate concept is any of: retrieved from the data warehouse with its respective at least one signature, received as an input from a user device, and received as an input from the user's supervisor device.

13. The system of claim 12, wherein the at least one signature for the received multimedia content element is generated by a signature generator system (SGS), wherein the SGS is communicatively connected to the system.

14. The system of claim 11, wherein the system is further configured to: generate the reduced cluster of signatures by performing a cluster reduction process that comprises reducing a number of signatures of the reduced cluster while remaining a minimal number of signatures to that still identify all of the plurality of multimedia content items.

15. The system of claim 11, wherein the signatures representing the plurality of multimedia content elements represent responses of one or more neural networks to the plurality of multimedia content elements.

16. The system of claim 10, wherein the system is further configured to use at least one probabilistic model to match between the signatures.

17. The system of claim 10, wherein the received multimedia content element is at least one of: an image, graphics, a video stream, a video clip, an audio stream, an audio clip, a video frame, a photograph, images of signals, and portions thereof.

18. The system of claim 10, wherein the at least one inappropriate concept is determined based on a set of characteristics of a user of the user device.

19. The system of claim 18, wherein the user's characteristics are at least one of: age, geographic location, religion, and background.

20. The method of claim 1, wherein each signature is generated by a signature generator system, wherein the signature generator system includes a plurality of computational cores configured to receive a plurality of unstructured data elements, each computational core of the plurality of computational cores having properties that are at least partly statistically independent of other of the computational cores, the properties are set independently of each other core.

* * * * *